US010913329B2

(12) United States Patent
Roesemann et al.

(10) Patent No.: US 10,913,329 B2
(45) Date of Patent: Feb. 9, 2021

(54) COMPONENT SYSTEM FOR VENTILATING A TRUNK COMPARTMENT AREA AND MOTOR VEHICLE

(71) Applicant: Volkswagen Aktiengesellschaft, Wolfsburg (DE)

(72) Inventors: Harald Roesemann, Gifhorn (DE); Jennifer Paschke, Sickte (DE); Dennis Leip, Magstadt (DE); Adriano Podda, Vaihingen/Enz (DE); Christian Wendl, Ditzingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/157,762

(22) Filed: Oct. 11, 2018

(65) Prior Publication Data
US 2019/0105966 A1 Apr. 11, 2019

(30) Foreign Application Priority Data
Oct. 11, 2017 (DE) .......................... 10 2017 123 698

(51) Int. Cl.
*B60R 5/04* (2006.01)
*B60H 1/24* (2006.01)
(Continued)

(52) U.S. Cl.
CPC ............. *B60H 1/244* (2013.01); *B60H 1/246* (2013.01); *B60H 1/247* (2013.01); *B60H 1/26* (2013.01);
(Continued)

(58) Field of Classification Search
CPC ... B60R 5/04; B60R 5/043; B60R 2011/0029; B60R 2011/0036; B60R 13/011;
(Continued)

(56) References Cited

U.S. PATENT DOCUMENTS 5,392,873 A * 2/1995 Masuyama ............. B60R 16/04
180/68.5
6,094,927 A * 8/2000 Anazawa ............ H01M 10/613
62/239
(Continued)

FOREIGN PATENT DOCUMENTS

DE 102004020930 A1 12/2005
DE 202007006995 U1 7/2007
(Continued)

*Primary Examiner* — Gregory A Blankenship
(74) *Attorney, Agent, or Firm* — Muncy, Geissler, Olds & Lowe, P.C.

(57) ABSTRACT

A component system for ventilating a trunk compartment area and a motor vehicle for the purpose of cooling at least one unit located in the trunk compartment area and a motor vehicle, in particular a passenger motor vehicle. The component system has a loading floor for storing objects, the trunk compartment area can be arranged below the loading floor, and a first component which delimits the trunk compartment area in sections, in particular a bodyshell component. Between the loading floor and the first component, at least one passage is arranged for guiding an air flow into the trunk compartment area.

9 Claims, 3 Drawing Sheets

(51) Int. Cl.
   *B60R 13/01* (2006.01)
   *B60H 1/26* (2006.01)
   *B60L 58/26* (2019.01)
   *B60H 1/00* (2006.01)

(52) U.S. Cl.
   CPC .......... *B60R 5/04* (2013.01); *B60H 2001/006* (2013.01); *B60H 2001/00614* (2013.01); *B60L 58/26* (2019.02); *B60R 13/013* (2013.01)

(58) Field of Classification Search
   CPC . B60R 13/013; B60R 2013/016; B60H 1/244; B60H 1/246; B60H 2001/00614; B60H 1/247; B60H 1/26; B60H 2001/006; B60L 58/26
   See application file for complete search history.

(56) References Cited

U.S. PATENT DOCUMENTS

| | | | |
|---|---|---|---|
| 7,396,075 B2 | 7/2008 | Ohkuma et al. | |
| 7,688,582 B2* | 3/2010 | Fukazu | B60K 1/04 361/690 |
| 9,623,741 B2* | 4/2017 | Honda | B60K 1/04 |
| 2001/0030069 A1* | 10/2001 | Misu | B60K 1/04 180/68.1 |
| 2005/0088005 A1* | 4/2005 | Krueger | B60R 5/04 296/37.8 |
| 2008/0196957 A1* | 8/2008 | Koike | B60K 1/04 180/68.5 |
| 2009/0008060 A1 | 1/2009 | Robinet et al. | |
| 2009/0205891 A1* | 8/2009 | Parrett | B60K 1/04 180/68.1 |
| 2009/0218849 A1 | 9/2009 | Rupar | |
| 2014/0117693 A1* | 5/2014 | Schmitz | B60R 13/02 296/1.08 |
| 2014/0127471 A1* | 5/2014 | Matsubara | B32B 27/00 428/172 |
| 2014/0145465 A1* | 5/2014 | Preisler | B32B 3/12 296/37.5 |
| 2016/0236584 A1* | 8/2016 | Miftakhov | B60L 53/305 |
| 2016/0280155 A1* | 9/2016 | Greggs | B62D 25/087 |
| 2019/0105966 A1* | 4/2019 | Roesemann | B60R 5/04 |
| 2019/0118692 A1* | 4/2019 | Qiu | B60L 1/02 |
| 2019/0263558 A1* | 8/2019 | Plant | B65D 11/1873 |

FOREIGN PATENT DOCUMENTS

| | | |
|---|---|---|
| DE | 202008002920 U1 | 5/2008 |
| DE | 102009055835 A1 | 6/2011 |
| DE | 102015003674 A1 | 12/2015 |
| JP | H0260006 U | 5/1990 |
| JP | 2005075082 A | 3/2005 |
| JP | 2007-022350 A | 2/2007 |

* cited by examiner

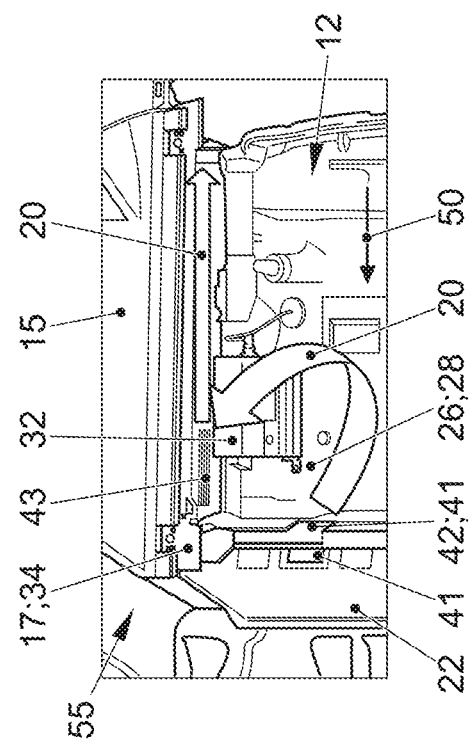

COMPONENT SYSTEM FOR VENTILATING A TRUNK COMPARTMENT AREA AND MOTOR VEHICLE

This nonprovisional application claims priority under 35 U.S.C. § 119(a) to German Patent Application No. 10 2017 123 698.8, which was filed in Germany on Oct. 11, 2017, and which is herein incorporated by reference.

BACKGROUND OF THE INVENTION

Field of the Invention

The present invention relates to a component system for ventilating a trunk compartment area and a motor vehicle for the purpose of cooling at least one unit located in the trunk compartment area and a motor vehicle, for example a passenger motor vehicle.

Description of the Background Art

In motor vehicles, electrical or electronic units are increasingly being arranged which produce waste heat during use and which must therefore be cooled in order to guarantee permanent, error-free operation. In particular in the field of hybrid and electric vehicles, super capacitors and/or secondary batteries which need to be cooled are provided for storing electrical energy.

Electrical or electronic units to be cooled can for example be arranged in a trunk compartment area located below the loading floor of the trunk compartment. A known solution for cooling units located there is the use of the air available in the trunk compartment. Depending on the cooling capacity required to cool the units, the air quantity available in the trunk compartment is not always sufficient, however.

In order to ventilate the units to be cooled, interior air of the motor vehicle can be used. Motor vehicles typically have forced venting, which is a connection between the interior of the vehicle and the surrounding area which cannot be influenced by the user. By means of this connection, for example, unwanted air pressure peaks are prevented when closing doors and a ventilation of the vehicle interior is guaranteed. The concepts described below are based on the use of air from the interior of the vehicle, which is guided outwards via the forced venting.

DE 20 2007 006 995 U1 describes an arrangement of electronic components in a vehicle, which comprises a holding device for the electronic components in a storage space created in the trunk compartment of the vehicle and arranged on the side. The storage space is located in the area of the forced venting of the vehicle and typically behind the trunk compartment cladding. The electronic component is arranged upstream in the flow of air at a distance from a ventilation opening for forced venting in the trunk compartment, and can be flowed around by the forced venting flow in the vehicle. Thus, the available forced venting flow acts as a coolant for the electronic components at the same time.

DE 10 2015 003 674 A1 discloses a device for venting a vehicle interior, in which the loading floor of a trunk compartment is equipped with several ventilation openings distributed over the loading floor area. The air flows through these into an air chamber arranged below the loading floor and then outwards via outlets in the rear closure panel. The air chamber can for example be a hollow-like depression, as is known for example for arranging a spare wheel. The ventilation openings can be formed by a plurality of holes and/or be equipped with covers.

SUMMARY OF THE INVENTION

It is therefore an object of the invention to provide a component system for ventilating a trunk compartment area and a motor vehicle with such a component system, with which in a simple, effective and low-cost manner, the cooling of at least one unit located in the trunk compartment area is possible.

In an exemplary embodiment of the component system for ventilating a trunk compartment area of a motor vehicle for cooling at least one unit located in the trunk compartment area, included is a loading floor for storing objects, the trunk compartment area which is arranged below the loading floor, and a first component which delimits the trunk compartment area in sections, in particular a bodyshell component. Between the loading floor and the first component, at least one passage is arranged for guiding an air flow into the trunk compartment area.

In the trunk compartment area, the at least one unit to be cooled or a portion thereof can be arranged. In particular, this can comprise electrical or electronic components, such as capacitors or supercapacitors, also known as "supercaps", secondary batteries, power electronics, control and/or signal processing facilities, etc. Such units are frequently characterized by heat development during operation or use, whereby this exhaust heat should be discharged in order to guarantee stable, fault-free operation.

With the intended use of the motor vehicle comprising the component system, the trunk compartment area can be arranged below the trunk compartment that is usable by the user as storage space. Typically, it is separated from this, in particular by means of the loading floor. The loading floor is thus the floor of the trunk compartment usable by the user. Objects, for example for transportation in the motor vehicle having the component system, can be stored on said loading floor. The loading floor can be firmly installed or firmly installable. Alternatively, it can be designed as a removable shelf. The loading floor can be compiled or comprise several components or layers. In particular, the loading floor delimits the trunk compartment area in sections.

In particular, the first component delimits the trunk compartment area in the direction towards the front of the vehicle of a motor vehicle having the component system. It therefore forms a front limitation of the trunk compartment area. It is typically longitudinal in form and is arranged transverse to the direction of driving of the motor vehicle. Limitation in the sense of the invention means that a form of an area of the respective compartment, such as the trunk compartment area, is at least essentially defined by the respective component, such as the first component. Here, other components, such as cladding, covers or similar can naturally be arranged in the trunk compartment area and clad the first component in the direction of the trunk compartment area.

The first component can be a bodyshell component, i.e. a part of the vehicle body, such as a cross member or a part of a cross member, for example. It can be a sheet metal component.

The passage forms a flow connection between the trunk compartment area and the interior of the motor vehicle. It is designed such that air can flow from the interior of the vehicle through it into the trunk compartment area. The passage can be a hole or gap. Here, the vehicle interior refers in particular to the free space in the motor vehicle that is delimited by the interior surfaces of the motor vehicle. Typically, a plurality of passages is arranged. In particular, several passages are arranged distributed over the longitudinal extension of the first component.

The passage can be dimensioned such that at least the air quantity required for cooling the at least one unit arranged which is to be cooled can be provided under the operating conditions. Here, the temperatures of the unit to be cooled and the air in the vehicle interior and the flow conditions of the air should be taken into account.

The passage can be located at least in sections between the loading floor and the first component. In other words, its position is defined as being located between the loading floor and the first component. Here, the passage does not necessarily need to be delimited or formed by one or both of the above parts. For example, it can be realized as a gap between the loading floor and the first component or as a gap or opening in the loading floor or in the first component.

In other words, the loading floor and the first component can be designed and/or positioned relative to each other such that between them, there is at least one passage for guiding through an air flow. The loading floor and/or the first component can naturally be partially or fully cladded in the area of the passage.

The guiding through of the air flow is achieved through the passage and into the trunk compartment area. In particular, the trunk compartment area can have at least one further opening to discharge the air flow. This can be arranged on a side of the trunk compartment area adjacent to the passage and/or on a side opposite said passage. A further opening of this type can for example be an existing ventilation element for forced venting, which is connected in terms of the flow with the trunk compartment area.

With the component system according to the invention, the cooling of at least one unit located in the trunk compartment area can be realized in a simple, effective, low-cost manner. Further, during the summer in particular, the use of the cooled air from the vehicle interior for cooling the unit is advantageous, since larger heat quantities can thus be absorbed compared to the warmer outside air.

The first component can be used for the mechanical support of the loading floor.

The support can refer to the at least partial absorption of forces, for example, weight forces, with the intended use against the direction of gravity.

This means that in at least one point or one surface, a direct or indirect contact exists between the first component and the loading floor, so that at least in this point or this surface, a mechanical support of the loading floor by the first component occurs. Here, the passage can be arranged next to this surface when viewed from above. Typically, several surfaces are arranged which are designed to support the loading floor, between each of which passages for guiding through the respective air flows are located.

The first component can be a bodyshell component, so that the weight force of the loading floor and/or any objects arranged on it can at least in part be transferred to the vehicle body. The first component can be a bodyshell cross member, which serves to provide the necessary rigidity of the body.

This design offers the advantage that the first component required to support the loading floor is at the same time used to realize the passage for the air flow. Thus, no additional components or no structural changes to the existing components are required.

The component system can further comprise a cover element for covering the first component. This is arranged and/or designed such that between the first component and the cover element, a hollow space is formed that is connected with the trunk compartment area in terms of the flow. The flow connection between the trunk compartment area and the hollow space forms the passage.

The hollow space can be located upstream in the flow of air in the trunk compartment area. Thus, the flow of air to be realized can be guided from the interior of the vehicle into the hollow space, and from this into the trunk compartment area. The hollow space can, in the same way as the trunk compartment area, be used for the arrangement of at least one unit to be cooled. In particular, the hollow space is arranged along the direction of driving of the motor vehicle in front of the first component. It can be delimited by this component in sections. The cover element can delimit the hollow space in relation to the vehicle interior in a direction toward the front and/or an upward direction.

The cover element can serve to cover the first component in the direction of the vehicle interior of the motor vehicle having the component system. It can also serve as a visual screen for the first component and to house electrical or electronic units. Typically, it is designed as a plastic part.

This design has the advantage that with the cover element, an optically pleasing visual screen is provided for the first component, which at the same time is used as a function element for realizing the air flow. Furthermore, an additional usable space is provided with the hollow space. Due to the extended flow path of the air flow, a clear reduction or damping of the sound emitted from the trunk compartment area is achieved.

The cover element can have at least one first recess for guiding the air flow into the hollow space or trunk compartment area. Alternatively or in addition, a gap is arranged between the cover element and the loading floor for guiding through the air flow.

The first recess can be a passage hole with any form required, or a recess arranged on an edge of the cover element. Several first recesses can be arranged, which can be designed similar to each other and/or differently.

For example, the first recess can be realized as a passage hole in the lower section of the cover element. Via the width of the cover element, i.e. over its direction of expansion transverse to the direction of driving of the motor vehicle, several first recesses can be distributed.

In the side areas of the cover element, i.e. close to its boundaries in the motor vehicle on the right and left, first recesses can be arranged.

This offers the advantage that the flow paths of the air flow are longer for ventilating the hollow space or the trunk compartment area and thus provide greater acoustic screening. Furthermore, the so-called "flow paths" are realizable in a highly variable manner depending on the respective requirements, since a plurality of options exist for arranging and designing the recesses.

A ventilation of the hollow space is possible through ventilation openings in the loading floor. In this case, the air can flow through these into the hollow space and from there through the passage into the trunk compartment area.

The flow connection between the hollow space and the trunk compartment area can comprise a second recess formed by the cover element and/or a cladding of the first component.

The cover element and/or a cladding of the first component can form or has a second recess, which can be a passage hole with any form required or a recess arranged on an edge of the cover element or the cladding. Several second recesses can be arranged, which can be designed similar to each other and/or differently. The second recess forms a part of the flow connection between the hollow space and the trunk compartment area, and can be arranged close to the passage. It can be part of the passage. The cladding of the first component clads the component, for example, with respect to the hollow space, to the passage and/or to the trunk compartment area.

The cover element can for example extend counter to the direction of driving of the motor vehicle having the component system, further to the rear in the direction of the trunk compartment area. It can pass over the cladding of the first component or be formed together with it. In other words, the hollow space can be delimited at least in sections by a component which functions as cladding for the first component in relation to the hollow space on the one hand and as a cover element on the other, and in which at least one second recess is arranged for guiding the air flow in the direction of flow onto the trunk compartment area. The design of the cover element and the cladding as separate parts is also possible, whereby the second recess can be arranged between the two components. The cover element and/or cladding can extend through into the area between the first component and the loading floor. In one embodiment, the hollow space is essentially delimited by one component, such as a plastic part, which in its front or upper area serves as a cover element for covering the first component in the direction of the vehicle interior, and thus delimits the hollow space in the direction of the vehicle interior, and which in its rear or lower area forms a cladding of the hollow space and clads the first component in the direction of the hollow space. All direction and position information relates to the intended use of a motor vehicle having the component system.

The trunk compartment area can itself be partially or fully cladded with a floor cover. This floor cover can be realized as an absorbent fleece for noise insulation. It can be designed such that it clads the first component in the direction of the trunk compartment area. In the same way as the cover element, the floor cover can form a part of the flow connection between the hollow space and in the trunk compartment area. For this purpose, it can also have one or more recesses, also known as clearances. The floor cover of the trunk compartment area and the cladding of the hollow space can be connected to each other or merge with each other in order to fully clad the first component.

The flow connection between the hollow space and the trunk compartment area can be realized in a particularly simple manner, using fewer components. The bodyshell components can be cladded such that they are not visible to the user.

The component system can have at least one second component that delimits the trunk compartment area in sections, whereby the second component has at least one third recess, in particular an opening, for the discharge of the air flow from the trunk compartment area.

The second component can be, for example, a bodyshell component, such as a longitudinal support or the rear lock support, and/or serves to support the loading floor at the side. It can be a side and/or rear limitation of the trunk compartment area. Several second components can be arranged, which e.g. delimit the trunk compartment area in different directions. Typically, two second components are arranged on opposite facing sides of the trunk compartment area and delimit these on both sides. In particular, each of the second components has at least one third recess.

The air flow can be guided through the passage from the front into the trunk compartment area, and be taken out at the side, for example, on both sides from the trunk compartment area. After discharge from the trunk compartment area through the third recess, the air flow can be guided outside the trunk compartment area towards a ventilation element for forced venting.

The third recess can be a passage hole with any form required, or at least one recess arranged on an edge of the third component. Like every recess, it can have a cover or grid in order to prevent penetration by objects. The third recess forms the flow connection between the trunk compartment area and an area located behind the second component, which can for example be a flow channel for discharging the air.

This design offers the advantage that in a simple, low-cost manner, the discharge of the air used for cooling can be realized. Further, the air flow can be realized such through a suitable arrangement and design of the passages that a particularly efficient heat transfer is enabled, for example through suitable turbulence.

The component system can have at least one ventilation element which is connected in terms of the flow with the trunk compartment area, for realizing the air flow through the trunk compartment area. This can in particular be a forced ventilator.

The ventilation element can serve to discharge the air flow into the surrounding atmosphere of the motor vehicle. It can be set up to generate an underpressure for sucking in air from the vehicle interior or the hollow space through the passage into the trunk compartment area, and in this manner be suitable for realizing the air flow.

The ventilation element can be a forced ventilator, i.e. an opening that connects the vehicle interior with the surrounding atmosphere of the vehicle, which is used for forced venting. This can for example be designed such that as a result of the air flow arising around the motor vehicle during driving of the motor vehicle, an underpressure is realized that is suitable for ventilating the vehicle interior.

The ventilation element can be located upstream in the flow of air from the trunk compartment area. In the presence of a second component, it can be connected with the area located behind the second component in terms of the flow, so that the air from the trunk compartment area can be guided through the third recess into the area located behind the second component, in particular counter to the direction of driving, can be guided backwards and can be discharged into the surrounding atmosphere of the vehicle by the ventilation element. In particular, ventilation elements can be arranged on both sides.

The ventilation element can be set up to discharge the air flow from the trunk compartment area.

This design offers the advantage that the air flow can be realized or generated for the forced venting using the existing ventilation elements. Thus, a simple and stable solution is provided without additional parts.

The first recess of the cover element and the passage can be arranged such that they form an acoustic labyrinth.

An acoustic labyrinth means a facility for preventing a straight dissemination of noise or for reducing the acoustic irradiation. Means used for this purpose include successive deflections and profile changes of a profile in which noise is transferred. The acoustic labyrinth serves in particular, in connection with the invention, to reduce the share of noise in the trunk compartment area which is transferred to the vehicle interior, and thus to reduce the level of driving noise in the vehicle interior. The noise in the trunk compartment area is carried into said trunk compartment area from the outer atmosphere surrounding the vehicle, via the bodyshell and via openings, such as through openings for forced venting.

In order to guide the air flow through from the vehicle interior into the hollow space, the first recess of the cover element is provided, and for enabling the air flow to be guided from the hollow space into the trunk compartment area, the passage is provided. To prevent noise from reaching the vehicle interior directly and thus largely undamped from the trunk compartment area, the first recess and the passage are in this design arranged such that the noise, starting from its entry point into the trunk compartment area, must change direction at least once, and in particular at least twice, before it reaches the vehicle interior. Thus, despite the presence of a flow connection from the vehicle interior to the atmosphere surrounding the motor vehicle, a significant attenuation of the sound, and thus noise minimization, is achieved in the vehicle interior. Thus, the share of noise entering the vehicle interior via the forced venting can be considerably reduced.

In addition, the trunk compartment area and/or the hollow space can be cladded with noise-absorbing materials.

This design offers the advantage that despite the existing and necessary opening for ventilation outwards, the sound entering is largely reduced, and thus the noises in the vehicle can be kept at a minimum. Large air quantities can thus also be provided in the trunk compartment area without interfering driving noises.

A second aspect of the invention is a motor vehicle, in particular a passenger motor vehicle. This has at least one component system according to the invention for ventilating a trunk compartment area.

In particular, the passage is arranged for guiding through an air flow which is essentially directed against the direction of driving of the motor vehicle, so that air from the front part of the vehicle can be used to cool the unit arranged in the trunk compartment area.

In a design of the motor vehicle, this further has at least one unit to be cooled, in particular comprising at least one supercapacitor. This is arranged in the trunk compartment area such that it can be cooled by means of at least one air flow that is guided into the trunk compartment area.

A unit to be cooled is an object that is intended for cooling. In particular, it is an object that heats up during use. The excess heat created during the process is discharged in order to permanently guarantee the functionality of the unit. In particular, as described, electrical or electronic units are meant, such as capacitors or supercapacitors, also known as "supercaps", secondary batteries, power electronics, control and/or signal processing facilities, etc.

In particular, the air flow is guided through the passage into the trunk compartment area. Typically, the air flow is discharged from the trunk compartment at another site, in particular by means of a third recess of a second component, so that an air flow that passes through can be realized for cooling. The unit is in particular arranged in the trunk compartment area such that it is located in the air flow to be generated for the purpose of realizing efficient heat transfer. In particular, the air flow is to be designed such that it is turbulent, in order to achieve maximum heat transfer.

The motor vehicle can have at least one unit to be cooled in the hollow space as an alternative or an addition to the unit to be cooled in the trunk compartment area.

A further aspect of the invention is a method for ventilating a trunk compartment area of a motor vehicle for cooling at least one unit located in the trunk compartment area. Here, through a passage that extends between a loading floor for storing objects and a first component that delimits a trunk compartment area of the motor vehicle in sections, in particular a bodyshell component, an air flow is guided and guided into the trunk compartment area for the purpose of cooling the unit located there.

In particular, the method for implementation is realizable with the component system according to the invention and/or the motor vehicle according to the invention. In this case, alongside the provision of the component system or the motor vehicle, it comprises the guiding of an air flow through the passage into the trunk compartment area.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein

FIG. 3: shows a perspective view of the cover element from FIG. 2;

FIG. 4: shows a perspective side view of a motor vehicle trunk compartment with the component system according to the invention;

DETAILED DESCRIPTION

Figure 1:
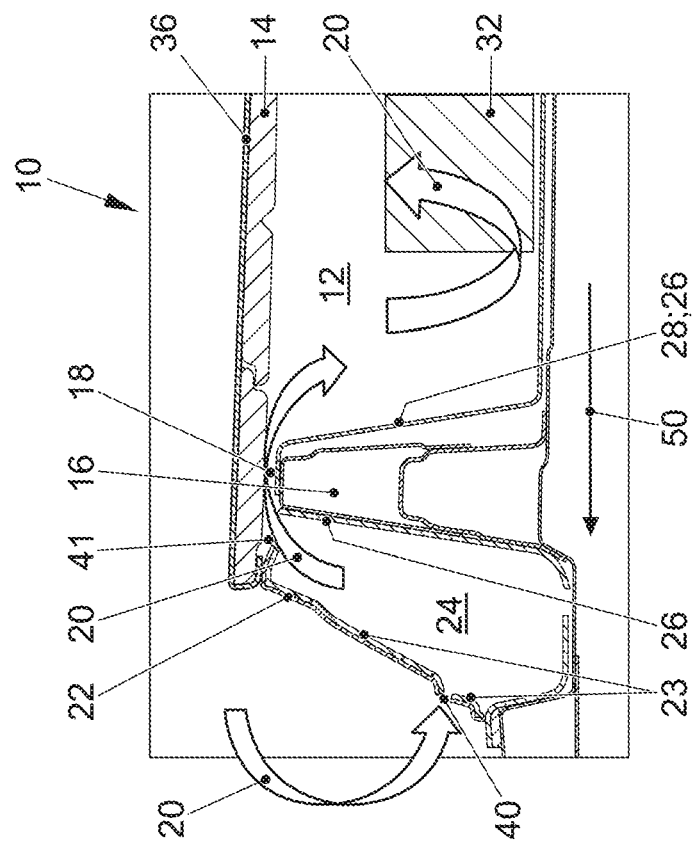
FIG. 1: shows a perspective view of a motor vehicle trunk compartment.

FIG. 1 shows a motor vehicle trunk compartment diagonally from above. The usable loading floor 14 available to the user for storing objects is the lower limitation of the trunk compartment. To the right and left, side walls 15 delimit the trunk compartment. The loading floor 14 is equipped with a textile cover 36. Below the loading floor 14, there is a trunk compartment area for arranging units to be cooled. Shown above on the right is the rear lock support 30, on which the lock is arranged for closing the tailgate. This is a part of the motor vehicle body and is firmly connected with the other bodyshell components 34. In the bodyshell 34, a ventilation element 35 is arranged at the side which is designed as an opening for discharging an air flow from the vehicle interior 55 into the surrounding atmosphere of the vehicle; on the other side, the same ventilation element 35 is provided.

The trunk compartment is delimited along the driving direction 50 towards the front by the cover element 22, which is also known as the bulkhead partition cover. Further towards the front, fastening elements are located for arranging the vehicle seats, as are cladding parts lying between them.

Figure 2:
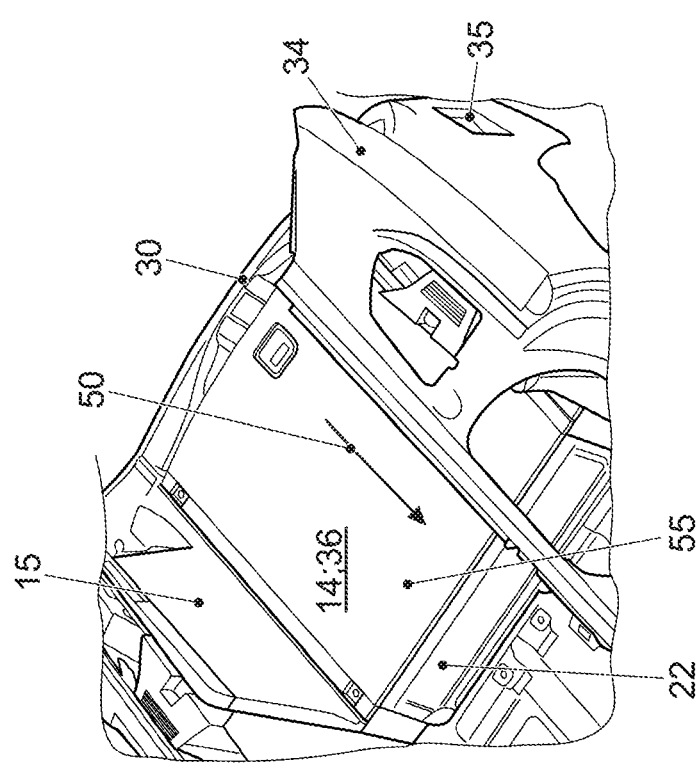
FIG. 2: shows a longitudinal cross-section of the component system according to an exemplary embodiment of the invention.

In FIG. 2, the component system 10 according to the invention is shown in a longitudinal section along the direction of driving 50. It can be seen that the loading floor 14 and the first component 16, which is a bodyshell component, namely a bodyshell cross member, delimit the trunk compartment area 12 in sections. In the trunk compartment area 12, a unit to be cooled 32 is shown schematically. By means of the air flow 20, air is guided past the unit 32 for the purpose of cooling. Between the loading floor 14 and the first component 16, the passage 18 is arranged through which an air flow 20 can be guided into the trunk compartment area 12.

The trunk compartment area 12 is cladded with a floor cover 28 located there. The area of the floor cover 28 shown on the left is here a cladding 26 of the first component 16.

To the left of the first component 16, i.e. upstream in the air flow of the passage 18, there is a hollow space 24 which is delimited in the direction of the vehicle interior 55 by a cover element 22. The cover element 22 covers the first component 16 such that the hollow space 24 is formed. In the lower area of the cover element 22, a first recess 40 is located through which the air flow 20 can be guided from the vehicle interior 55 into the hollow space 24.

On the side of the first component 16, the hollow space 24 is cladded with a cladding 26. It can be seen that the cover element 22 and the cladding 26 form a second recess 41 between each other, through which the air flow 20 can flow into the trunk compartment area 12 from the hollow space 24 via the passage 18 arranged directly behind the second recess 41. The textile cover 36 of the loading floor is bent in a U-shape around the loading floor 14 in its front section as seen along the direction of driving 50, and there comes into contact with the cover element 22.

The first component 16 serves to mechanically support the loading floor 14. Vertical to the image level, several passages 18 are arranged, distributed over the breadth of the motor vehicle, which are separated in each case by connecting areas, in which there is a mechanical connection between the first component 16 and the loading floor 14.

Further, it can be seen that the first recess 40 of the cover element 22 and the passage 18 can be arranged such that they form an acoustic labyrinth. In order to prevent sound from the trunk compartment area 12 entering the vehicle interior 55 directly and thus largely undiminished, the first recess 40 and the passage 18 are arranged such that the sound in the trunk compartment area 12 must change direction twice before it reaches the vehicle interior 55, namely once in the area of the passage 18 and a second time in the interior of the hollow space 24. Thus, it is ensured that only a minimal share of the sound entering the trunk compartment area 12 from the outside reaches the vehicle interior 55.

In addition, the hollow space 24 and/or the trunk compartment area 12 can be cladded with noise-absorbent material 23.

FIG. 3 shows the cover element 22 from the front, i.e. with the direction of view counter to the direction of driving of the motor vehicle. It can be seen that to the right and left on the outside, one first recess 40 is arranged respectively. In addition, there is a series of first recesses 40 in the area of the lower edge. Schematically, it is shown how air flows 20 are guided from the vehicle interior 55 through the respective first recesses 40 into the hollow space, which is located behind the cover element 22.

As could already be seen from FIG. 2, the upper edge of the cover element 22 is in direct contact with the loading floor 14 or the textile cover 36 arranged on it.

FIG. 4 shows the design of the component system according to the invention already shown in FIG. 2, in a side view diagonally from above in a type of enlarged drawing.

On the left-hand side, which from the point of view of the direction of driving 50 is the front area of the component system, the cover element 22 is shown with the second recess 41 arranged on it. A corresponding second recess 41, also known as a clearance 42, is arranged in the cladding 26 covering the first component in the direction of the trunk compartment area 12, namely in the floor cover 28. In a mounted state, the forenamed second recesses 41 overlap to form an opening through which the air flow 20 can flow from the hollow space 24 via the passage 18 into the trunk compartment area 12.

Above the trunk compartment area 12 with the unit to be cooled 32 arranged therein, a second component 17 is shown, which is a part of the bodyshell 34. In this component, a third recess 43 is arranged, by means of which air guided into the trunk compartment area 12 can be guided out of it and discharged. For this purpose, a flow channel is located behind the second component 17, with which the air flow 20 shown with the straight arrow can be guided counter to the direction of driving 50 towards a ventilation element located on the rear side.

The second component 17 shown delimits the trunk compartment area 12 on the right-hand vehicle side. A similarly equipped second component 17 is arranged accordingly on the left-hand vehicle side. The second components 17 serve to mechanically support the loading floor on the side. The trunk compartment located above the loading floor is delimited at the side by the side wall 15 shown.

Figure 5:
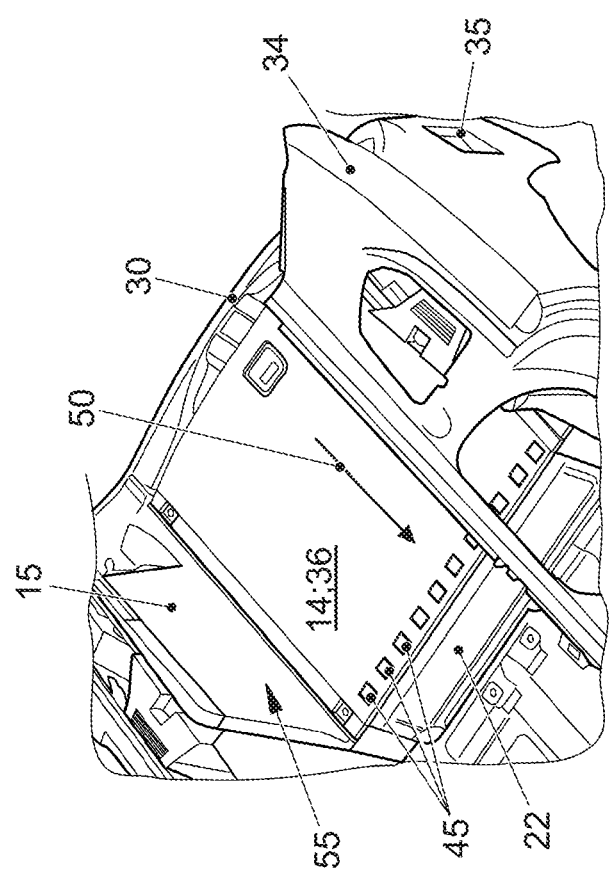
FIG. 5: shows a perspective view of a motor vehicle trunk compartment with a modified loading floor according to a design of the invention.

FIG. 5 shows a motor vehicle trunk compartment diagonally from above, similarly to FIG. 1. Unlike the design shown there, here a series of ventilation openings 45 is arranged along the front edge of the loading floor 14. As an alternative or in addition to the first recesses 40 arranged in the cover element 22, these can be provided in order to guide air from the vehicle interior 55, namely from the trunk compartment usable by the user for storing objects, directly into the hollow space between the cover element 22 and the first component.

Figure 6:
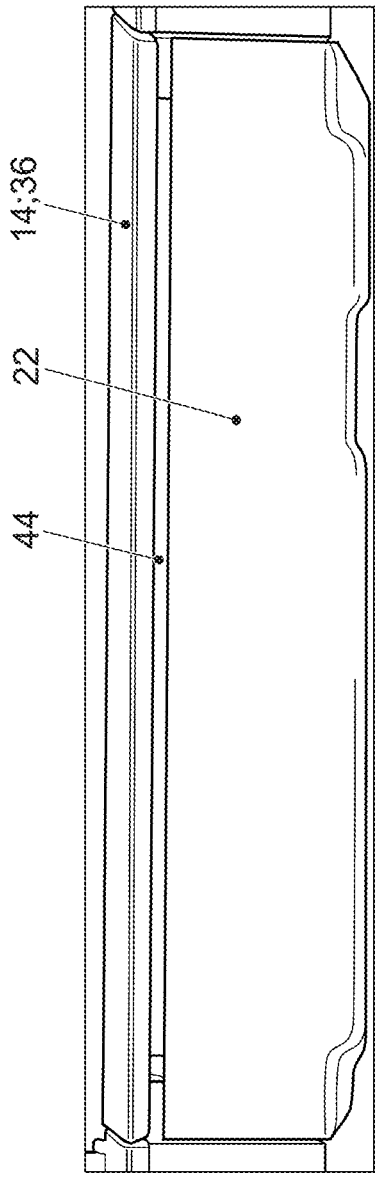
FIG. 6: shows a view of a transfer between the loading floor and the cover element modified according to a further design of the invention.

FIG. 6 shows a further alternative embodiment, in which unlike in FIG. 3, a gap 44 is arranged between the cover element 22 and the loading floor 14 or the textile cover 36 located there. This serves as an alternative to the first recesses 40 and is designed to guide the air located in the vehicle interior into the hollow space located behind the cover element 22. Naturally, such a gap 44 can also be provided in addition to at least one first recess 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A component system for ventilating a trunk compartment area of a motor vehicle for cooling at least one unit to be cooled in the trunk compartment area, the component system comprising:
  a loading floor, the trunk compartment area being arranged below the loading floor for storing objects;
  a bodyshell component that delimits the trunk compartment area into sections;

at least one passage being arranged between the loading floor and the bodyshell component, the at least one passage guiding an air flow into the trunk compartment area; and a cover element for covering the bodyshell component, wherein the cover element is arranged and/or designed such that between the bodyshell component and the cover element a hollow space is formed that is fluidically connected with the trunk compartment area, wherein the cover element has at least one first recess for guiding the air flow into the hollow space, and/or wherein between the cover element and the loading floor, a gap is arranged for guiding through the air flow into the hollow space.

2. The component system for ventilating a trunk compartment area according to claim 1, wherein the bodyshell component is a mechanical support of the loading floor.

3. The component system for ventilating a trunk compartment area according to claim 1, wherein the component system has at least one second component that partially delimits the trunk compartment area, and wherein the at least one second component has at least one third recess or an opening for discharging the air flow from the trunk compartment area.

4. The component system for ventilating a trunk compartment area according to claim 1, wherein the component system has at least one ventilation element fluidically connected with the trunk compartment area or a forced ventilator for realizing the air flow through the trunk compartment area.

5. A motor vehicle comprising the at least one component system for ventilating a trunk compartment area according to claim 1.

6. The motor vehicle according to claim 5, wherein the motor vehicle further has at least one unit to be cooled, and wherein the at least one unit is arranged in the trunk compartment area such that the at least one unit can be cooled by means of an air flow guided into the trunk compartment area.

7. The motor vehicle according to claim 6, wherein the at least one unit is a supercapacitor.

8. A component system for ventilating a trunk compartment area of a motor vehicle for cooling at least one unit to be cooled in the trunk compartment area, the component system comprising:
   a loading floor, the trunk compartment area being arranged below the loading floor for storing objects;
   a first component that delimits the trunk compartment area into sections;
   at least one passage being arranged between the loading floor and the first component, the at least one passage guiding an air flow into the trunk compartment area; and
   a cover element for covering the first component, wherein the cover element is arranged and designed such that between the first component and the cover element, a hollow space is formed that is fluidically connected with the trunk compartment area, and
   wherein the fluidic connection between the hollow space and the trunk compartment area comprises a second recess formed by the cover element and/or a cladding of the first component.

9. A component system for ventilating a trunk compartment area of a motor vehicle for cooling at least one unit to be cooled in the trunk compartment area, the component system comprising:
   a loading floor, the trunk compartment area being arranged below the loading floor for storing objects;
   a first component that delimits the trunk compartment area into sections;
   at least one passage being arranged between the loading floor and the first component, the at least one passage guiding an air flow into the trunk compartment area; and
   a cover element for covering the first component, wherein the cover element is arranged and designed such that between the first component and the cover element, a hollow space is formed that is fluidically connected with the trunk compartment area,
   wherein the cover element has at least one first recess for guiding the air flow into the hollow space, and
   wherein the at least one first recess of the cover element and the at least one passage are arranged such that they form an acoustic labyrinth.

* * * * *